United States Patent

Preiser

[15] 3,644,721

[45] Feb. 22, 1972

[54] APPARATUS AND METHOD FOR DIGITAL FREQUENCY ADDITION AND SUBTRACTION

[72] Inventor: Mark E. Preiser, Sterling Heights, Mich.

[73] Assignee: General Motors Corporation, Detroit, Mich.

[22] Filed: Nov. 9, 1970

[21] Appl. No.: 88,064

[52] U.S. Cl. ........................... 235/150.3, 318/231, 328/15, 328/133

[51] Int. Cl. ........................... G06f 15/20, H03b 3/04

[58] Field of Search ........................ 235/150.3, 150.31, 151.3; 318/231, 318, 503; 307/27, 73, 220, 233, 271; 328/15, 39, 41, 104, 133, 139, 158

[56] References Cited

UNITED STATES PATENTS

| | | | |
|---|---|---|---|
| 3,514,705 | 5/1970 | Feigleson | 328/133 |
| 3,519,929 | 7/1970 | Ault | 328/133 X |
| 3,477,002 | 11/1969 | Campbell | 318/231 X |
| 3,323,032 | 5/1967 | Agarwal et al. | 318/231 |
| 3,304,504 | 2/1967 | Horlander | 235/151.3 UX |
| 3,325,721 | 6/1967 | Clark | 328/15 X |

*Primary Examiner*—Eugene G. Botz
*Assistant Examiner*—Jerry Smith
*Attorney*—E. W. Christen and C. R. Meland

[57] ABSTRACT

The digital frequency system of this invention provides an output signal comprised of pulses which have a frequency equal to the sum or difference of the frequencies of two input signals. Each of the input signals is used to generate a first pulse train for summation or subtraction at the output of the system and a second pulse train for controlling the counting of the pulses of the first pulse train to ensure against error due to pulse overlap. If there is a possibility of error due to pulse overlap, one of the pulses to be counted is inhibited while the other is passed to the output. Each inhibited pulse is replaced by an auxiliary pulse which is then processed in the same manner as the original pulses.

4 Claims, 5 Drawing Figures

INVENTOR.
BY Mark E. Preiser

C. R. Meland
ATTORNEY

INVENTOR.
Mark E. Preiser
BY
C. R. Meland
ATTORNEY

INVENTOR.
Mark E. Preiser
BY
C. R. Meland
ATTORNEY

APPARATUS AND METHOD FOR DIGITAL FREQUENCY ADDITION AND SUBTRACTION

This invention relates to a method and apparatus for adding and subtracting in a digital system.

One arrangement of the digital system of this invention is operative to provide an output signal whose frequency represents the sum of the frequencies of two distinct input signals. A second configuration affords both addition and subtraction of input signals. Each of these digital arrangements utilizes a logic network to develop the desired output.

The present invention includes a provision to ensure against errors in addition or subtraction which can accompany overlapping pulses. Potential errors due to pulse overlap result from the fact that when two pulses representative of two input signals to be added overlap in time, only one output pulse will be produced if both signal pulses are passed directly to the output. To guard against this type of discrepancy, the present invention includes a monitoring means which inhibits one of the two signal pulses if there is a chance of overlap and error. In this situation, an auxiliary pulse is generated to replace the inhibited pulse. This auxiliary pulse is time separated from all signal pulses and it is processed in the same manner as the signal pulses. Accordingly, an accurate count is available at the output of the system.

The digital frequency system of this invention is well suited for inclusion in inverter electric drive motor control systems. In applications such as those generally set forth in U.S. Pat. No. 3,323,032 Agarwal, the system of this invention is utilized to sum the frequencies of a control signal and a signal representative of the speed of operation of the motor under control to regulate the frequency of the power supplied the motor. In this manner, a controlled slip motor arrangement is provided wherein the digital network of this invention effectuates frequency control of the inverter supplying the motor. This control is maintained in accordance with a signal representative of the motor's speed of operation and a slip signal reference control.

Accordingly, it is an object of this invention to provide a method for the addition of the frequencies of two input signals of the type described wherein overlapping pulses are precluded from passing directly to the output and wherein one pulse is inhibited and replaced by an auxiliary pulse on the occasion of pulse overlap.

Another object of the present invention is to provide a method for digital frequency addition wherein the frequencies of two input signals are added by converting each input signal into two pulse trains of different pulse widths, one to be added and one to be monitored, and passing directly the pulses to be added when the monitored pulses are nonoverlapping and inhibiting one of the pulses to be added and replacing it by an auxiliary pulse which is added when the monitored pulses are overlapping.

It is another object of the present invention to provide a system for adding or subtracting the frequencies of two input signals wherein a logic array performs a monitoring function to ensure an accurate count free of errors due to overlapping pulses.

These and other objects and advantages of this invention will be apparent in light of the following description. The figures listed below are incorporated in the description and illustrate preferred embodiments of the present invention.

Figure 1:
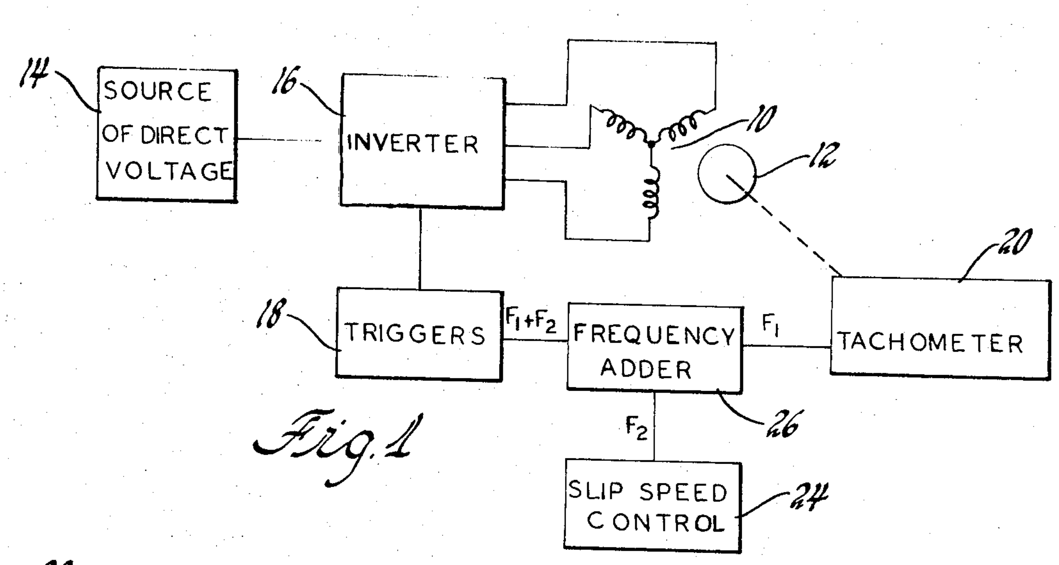
FIG. 1 is a block diagram schematic of a motor control network which includes a digital frequency adder made in accordance with the present invention.

Reference should now be made to the drawings and more particularly to FIG. 1 wherein a motor control system is shown including a three-phase AC induction motor 10 having a rotor 12 which is connected to an output load (not shown). The induction motor 10 is powered by a source of direct voltage 14 through a controlled rectifier inverter arrangement 16 which in turn is controlled by controlled rectifier gate signals from the triggers 18. A tachometer 20 is coupled with the rotor 12 to develop an electrical signal of frequency $F_1$ which frequency is a function of the speed of rotation of the rotor 12. The tachometer 20 provides a periodic signal such as a square wave as the speed indication signal. Tachometers of this type are generally known and, accordingly, the details of the tachometer 20 are not included here. This tachometer signal is combined with a reference signal of frequency $F_2$ from the slip speed control 24 in the frequency adder 26. The slip speed control 24 can take the form of a square-wave oscillator having a variable frequency output selectable by an operator control. Thus, a control signal having a frequency $F_1+F_2$ is developed at the output of the frequency adder 26 for connection with the triggers 18 to control the switching repetition rate or frequency of the controlled rectifiers in the inverter 16. It should be appreciated that the slip frequency of the induction motor 10 is thus controlled according to the control frequency $F_2$ selected for the slip speed control 24. In this manner, this known motor speed control system incorporates the digital frequency system of this invention in the frequency addition block 26. This digital frequency system is more completely described hereinafter.

If the digital frequency system of the frequency adder 26 functions as an adder summing the frequencies available from the tachometer 20 and the control 24, the induction motor 10 will be supplied power from the source 14 at a frequency such that normal motor operation will obtain. On the other hand, if the digital frequency system of the block 26 subtracts the frequency of the signal from the slip speed control 24 from the frequency of the tachometer signal available from the tachometer 20, the induction motor 10 will be braked inasmuch as the frequency applied to the triggers 18 will be $F_1-F_2$ which is less than the frequency necessary to maintain the motor's operating speed. It follows, therefore, that inclusion of this digital frequency system in the motor control arrangement affords versatility in the operation of the motor since either normal motoring or motor braking can be selected depending on the system requirements and the instantaneous function, addition or subtraction, of the digital system.

Figure 2:
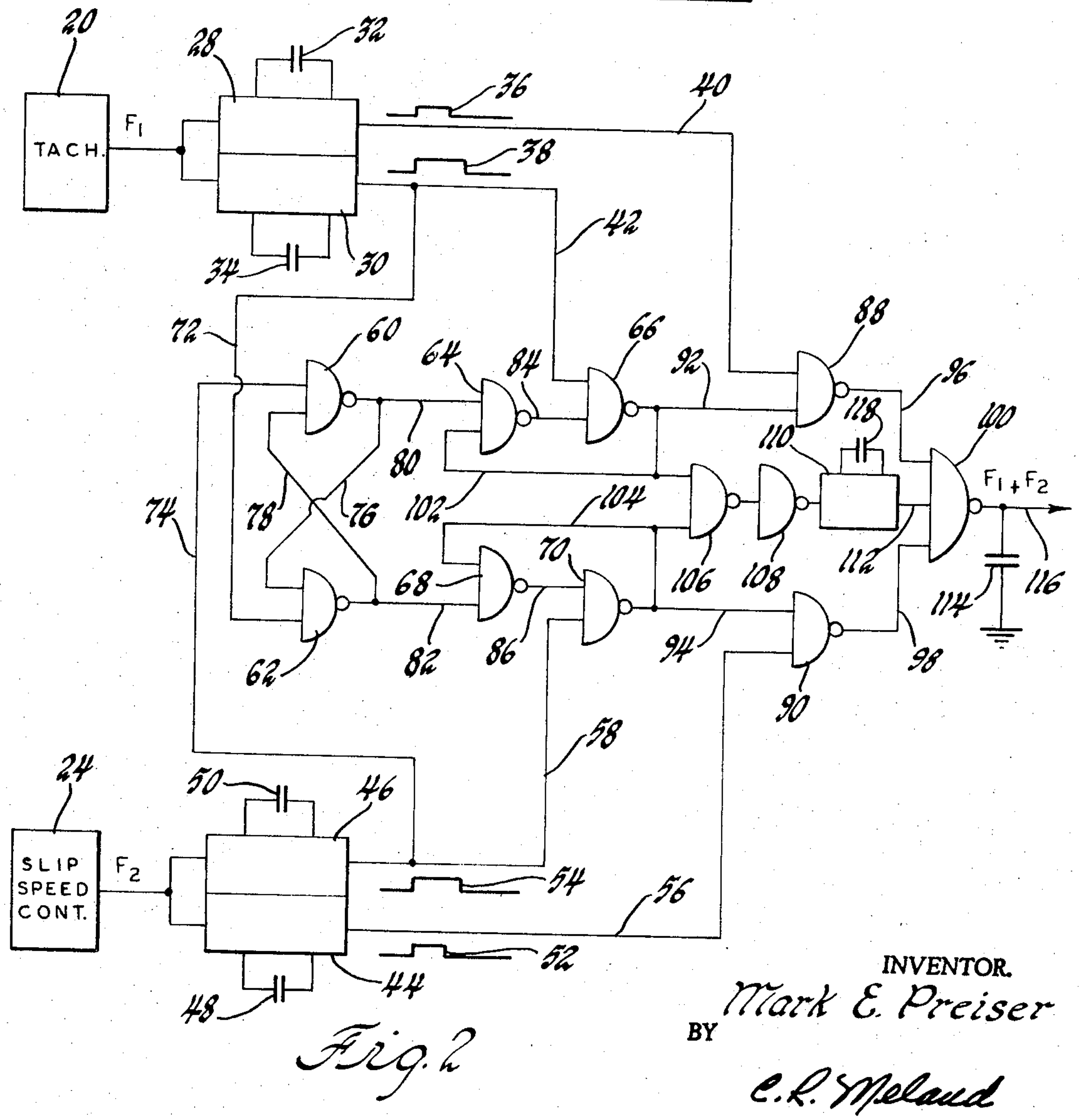
FIG. 2 is a schematic circuit of the digital frequency addition system of this invention.

In reference now to FIG. 2, the method of digital frequency addition of the instant invention and one apparatus for carrying forward that method will be described in detail. Two input signals $F_1$ and $F_2$, the tachometer and slip speed control signals of FIG. 1, are applied to the digital frequency system to generate the output signal $F_1+F_2$ whose frequency is the sum of the frequencies of the two input signals. The system of FIG. 2 is only capable of addition. Subtraction, as well as addition, is possible with the system of FIG. 3 described below. Of course, the operation of the system of FIG. 2 is identical to that described irrespective of the source of the signals $F_1$ and $F_2$ to be added.

Input signal $F_1$, generated by tachometer 20, is applied to the inputs of two monostable multivibrators 28 and 30 which are provided timing capacitors 32 and 34, respectively. In this manner, each cycle of the input signal $F_1$ creates two pulses 36 and 38 at the respective outputs of monostable multivibrators 28 and 30 on conductors 40 and 42. In a like manner, input signal $F_2$ from slip speed control 24 is applied to the inputs of monostable multivibrators 44 and 46 which include timing capacitors 48 and 50. Two output pulses 52 and 54 are available respectively at the outputs of the monostable multivibrators 44 and 46 on conductors 56 and 58.

The four monostable multivibrators 28, 30, 44, and 46 are of a conventional design which is generally available. A representative catalogue designation is Motorola's MC 667. These monostable multivibrators are designed to provide an output pulse when an input signal in excess of a threshold value is applied to them. The width of the output pulse thus generated is dependent on the size of the timing capacitor. Accordingly, capacitors 32, 34, 48 and 50 determine the widths of output pulses 36, 38, 52 and 54. In the arrangement of FIG. 2, capacitors 32 and 48 have identical capacitance which is half the capacitance of capacitors 34 and 50 which also have equal capacitance. Accordingly, pulses 36 and 52 have pulse widths which are equal and exactly half the width of pulses 38 and 54. The widths of the various pulses can be readily modified by substitution of capacitors.

It is noted that alternative monostable multivibrator input arrangements could be used. For example, the monostable multivibrators 28 and 30 could be serially connected such that pulse 38 would be generated when signal $F_1$ is applied to monostable multivibrator 30 and pulse 36 would be generated when pulse 38 is applied to the input of monostable multivibrator 28. The two monostable multivibrators 44 and 46 could be connected in an analogous fashion if it were desired to use this alternative arrangement.

Continuing the description of the FIG. 2 circuit, the output signal $F_1+F_2$ at the output of the system is the sum of the pulses 36 and 52 available from monostable multivibrators 28 and 44. It should be appreciated that an error in the output count could accompany the combination of the pulse trains which include the pulses 36 and 52 if pulses from each of the trains appear simultaneously or are overlapping. To obviate this problem and ensure an accurate count, provision is made to monitor pulses 36 and 52 and to supplement these pulses if an error would result. The monitoring is performed by the NAND logic array which includes NAND logic elements 60, 62, 64, 66, 68 and 70. The pulses 38 and 54 are connected with this logic array to afford a pulse signal to the monitoring array which is related to the pulses 36 and 52, thus providing control to ensure against errors due to overlap of the pulses 36 and 52. It is noted that the leading edge of pulse 54 is coincident with the leading edge of pulse 52. Also, the leading edges of pulses 36 and 38 are coincident.

It should be appreciated that the NAND logic gates of the FIG. 2 schematic are of a conventional design which is generally available. The conventional NAND function thus provided is such that the output of any NAND logic gate is at a low output value only if all input signals to that NAND logic gate are at a high input value. In all other situations, the output available from a NAND gate is at a high output value. For example, a three-input NAND gate will provide a high output value when one, two or all three inputs are provided a low input value and it will provide a low output value only during those time intervals in which all three of its inputs are provided a high input value.

Considering again the schematic of FIG. 2, a conductor 72 connects conductor 42 with one input of the two-input NAND-gate 62. Similarly, a conductor 74 connects one input of the two-input NAND-gate 60 with the conductor 58. Accordingly, the pulses 38 on conductor 42 and the pulses 54 on conductor 58 are coupled respectively with NAND-gates 62 and 60. A conductor 76 connects the output of NAND-gate 60 with the second input of NAND-gate 62. In a like manner, a conductor 78 connects the output of NAND-gate 62 with the second input of NAND-gate 60. During time intervals intermediate pulses 38 on conductor 42, the signal on conductor 42 is at a low value such that the input applied the NAND-gate 62 by conductor 72 has a low input value. Similarly, the signal on conductor 74 is at a low value intermediate pulses 54. Whenever the inputs on conductors 72 and 74 are at a low input value, the respective outputs from NAND-gates 62 and 60 on conductors 82 and 80 have a high output value. Thus, the output on conductor 80 and NAND-gate 60 will always have a high output value during time intervals intermediate pulses 54. And, in a similar manner, the output on conductor 82 from the NAND-gate 62 will always have a high output value during time intervals intermediate pulses 38.

The conductors 80 and 82 connect NAND-gates 60 and 62 with respective inputs of the two NAND-gates 64 and 68. The outputs of these NAND-gates 64 and 68 are connected by means of conductors 84 and 86 to respective inputs of the two-input NAND-gates 66 and 70. As seen in FIG. 2, conductors 42 and 58 connect the remaining inputs of NAND-gates 66 and 70 with the monostable multivibrators 30 and 46, respectively. The outputs from NAND-gates 66 and 70 are connected with respective inputs to the two NAND-gates 88 and 90 by two conductors 92 and 94.

The signal pulses 36 and 52 which are normally counted in the output signal $F_1+F_2$ are connected with the second inputs of NAND-gates 88 and 90 by the conductors 40 and 56. Two inputs of the three-input NAND-gate 100 are connected by conductors 96 and 98 with the outputs from NAND-gates 88 and 90.

Output signals from NAND-gates 66 and 70 on conductors 92 and 94 are connected respectively with the inputs of NAND-gates 64 and 68 by conductors 102 and 104. Additionally, the outputs on conductors 92 and 94 are used to supply the two input signals required by NAND-gate 106. The output signal available from NAND-gate 106 is connected with a single-input NAND-gate 108 which functions as an inverter and provides a connection from the monitoring logic array with a monostable multivibrator 110. The output from monostable multivibrator 110 is connected with the remaining input of NAND-gate 100 by the conductor 112. A capacitor 114 filters the output $F_1+F_2$ on conductor 116.

Figures 4, 5:
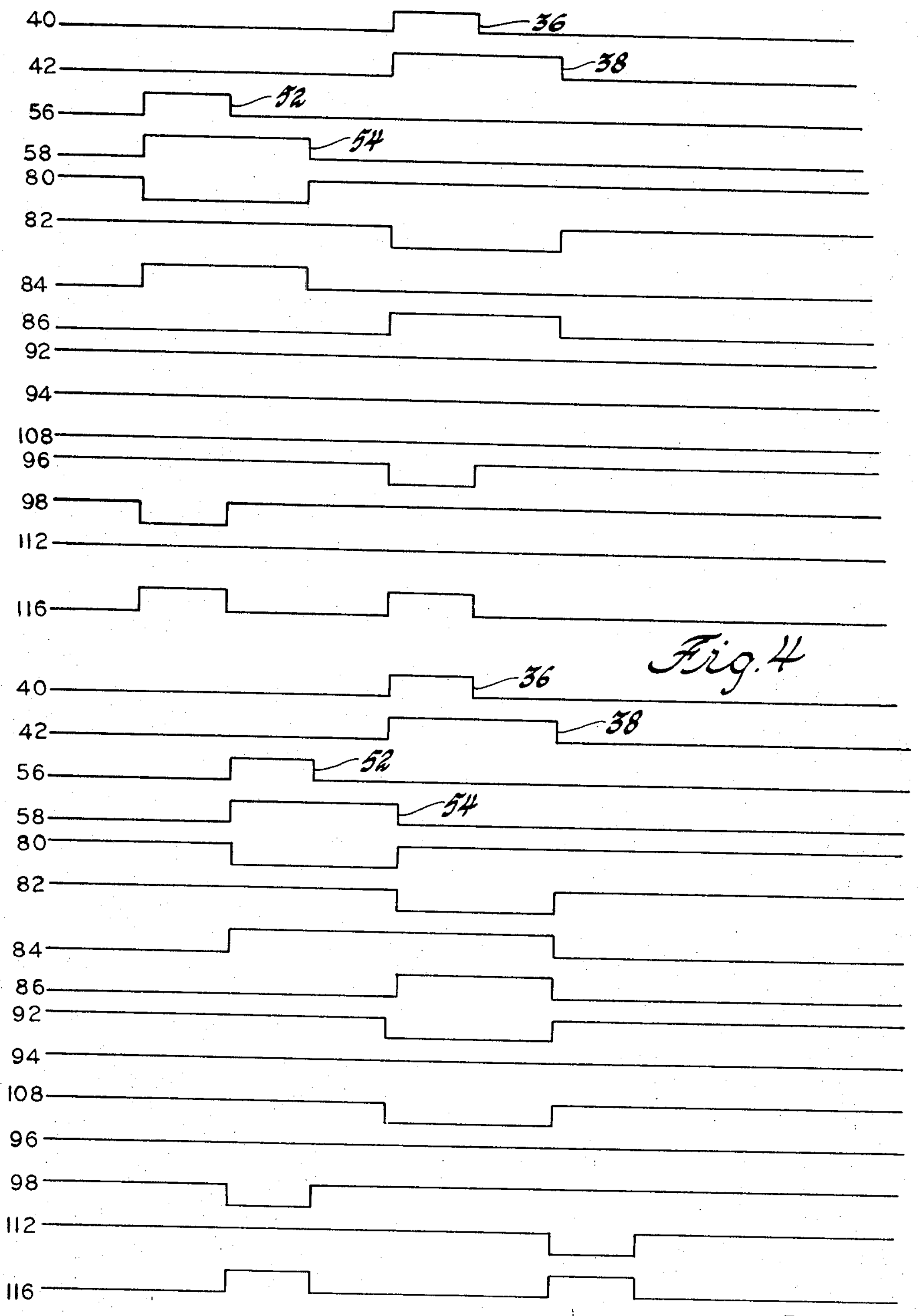
FIG. 4 is a set of curves describing the operation of the digital frequency adder of FIG. 2 when the pulses generated are nonoverlapping.
FIG. 5 is a set of curves describing the operation of the digital frequency adder of FIG. 2 when the pulses generated are overlapping.

The operation of this digital frequency addition circuit will now be described in conjunction with the timing diagrams of FIGS. 4 and 5. FIG. 4 limns the situation wherein the pulses 36 and 52 are nonoverlapping and wherein the pulses 38 and 54 are nonoverlapping. FIG. 5 depicts graphically the operation when overlapping pulses are produced by the monostable multivibrators 30 and 46. Pulses 52 and 54 are time advanced of pulses 36 and 38 in the FIG. 5 example. It should be appreciated that the performance of the digital frequency adder of FIG. 2 will be analogous to the operation set forth in FIG. 5 for any situation in which pulses 38 and 54 are overlapping. Certain operational modifications are required in the description for it to literally apply to those situations in which the leading edges of pulses 36 and 38 are time advanced from the leading edges of pulses 52 and 54. However, the operation in those situations wherein the leading edges of pulses 36 and 38 are time advanced from the leading edges of pulses 52 and 54 are similar and the distinctions are noted below.

The operation of the digital frequency addition system of FIG. 2 will now be explained with the aid of the timing diagram of FIG. 4. In this regard, it is noted that the various graphs of FIG. 4 are labeled with the numbers of the conductors in FIG. 2 whose voltages are depicted by the particular graphs.

In FIG. 4, pulses 52 and 54 on conductors 56 and 58 appear and are complete before pulses 36 and 38 on conductors 40 and 42 commence. Upon the appearance of pulse 54, the output from NAND-gate 60 on conductor 80 (graph 80, FIG. 4) switches from its high output value to its low output value since both inputs to the NAND-gate 60 are at their high input values. This low output value on conductor 80 is connected by conductor 76 to one input of NAND-gate 62 as noted above and accordingly, constrains the output from NAND-gate 62 on conductor 82 to its high output value for the duration of the pulse 54. In view of the low input value connected with the input of NAND-gate 64 by the conductor 80, it follows that the output on conductor 84 from the NAND-gate 64 must assume a high output value in response to the low output value on conductor 80 from the NAND-gate 60. This high output value on conductor 84 is sustained for the duration of the pulse 54. Again, it is pointed out that the graphs of FIG. 4 showing the switching sequence carry the same numerical notation as the conductors of FIG. 2.

Since both inputs to NAND-gate 68 on conductors 82 and 104 are at their high input values during the pulse 54, the value on conductor 94 is constrained to the high output value of NAND-gate 70 by the low output value connection from NAND-gate 68 on conductor 86. Thus, it should be appreciated that the input on conductor 94 to the NAND-gate 90 is at its high input value during the pulse 54 and the output from NAND-gate 90 on conductor 98 depends entirely upon the level of the signal available on conductor 56 to the input of NAND-gate 90. Accordingly, the output from NAND-gate 90 is at its low output value for a time coextensive with the pulse 52. This causes the output of the NAND-gate 90 to have a low output value, representing the pulse 52, for connection with one input of the NAND-gate 100 during this time interval. The remaining inputs to NAND-gate 100 on conductors 96 and 112 are both at their high values throughout this interval. Accordingly, the output from NAND-gate 100 on conductor 116 will include a pulse representing this cycle of the input signal $F_1$ as shown in FIG. 4. Upon the termination of the pulse 54, the output from the NAND-gate 60 on conductor 80 resumes its high output value and the output from NAND-gate 64 on conductor 84 resumes its low output value.

In a similar fashion, the pulses 36 and 38 cause various NAND gates in the FIG. 2 circuit to switch their output states and a pulse representative of this cycle of the input signal $F_2$ is added at the output. Briefly, the appearance of pulse 38 causes the output from NAND-gate 62 on conductor 82 to assume a low output value which level is maintained until the pulse 38 is terminated. Simultaneously, the output of NAND-gate 68 on conductor 86 assumes a high output value that lasts for the period of the pulse 38. The NAND-gate 88 is enabled by a high output value signal from NAND-gate 66 on conductor 92 and passes the pulse 36 for connection by conductor 96 with the input to the NAND-gate 100. NAND-gate 100 adds this pulse at the output on conductor 116, the resultant output signal on conductor 116 has two pulses as is shown in FIG. 4.

Referring now to FIG. 5, the situation wherein pulses 36 and 38 are initiated prior to the termination of pulse 54 is depicted. This mode of operation and the pulse overlapping correction feature of this invention will now be explained. In FIG. 5, the pulses 52 and 54 on conductors 56 and 58 generated in response to input signal $F_2$ are the first pulses to appear. Prior to the termination of pulse 54, the input signal $F_1$ causes the monostable multivibrators 28 and 30 to generate pulses 36 and 38 on conductors 40 and 42. Although the pulses 36 and 52 are nonoverlapping as they are drawn, it should be appreciated that the following description encompasses all of those overlapping situations in which the pulses 52 and 54 appear before the pulses 36 and 38 including the situation in which pulses 36 and 52 are overlapping. When pulse 54 is first applied by conductor 74 at the input of NAND-gate 60, it causes the output of NAND-gate 60 on conductor 80 to change to its low output value which is maintained until the termination of the pulse 54. Simultaneously, conductor 80 provides a low input value to NAND-gate 64 causing the output of NAND-gate 64 to assume its high output value on conductor 84. Since the output from NAND-gate 62 on conductor 82 is maintained at its high output value, the output from NAND-gate 68 on conductor 86 is constrained to its low output value. Accordingly, the output from NAND-gate 70 on conductor 94 is continually at its high output value enabling the NAND-gate 90 to pass pulse 52 to the input of the NAND-gate 100, similarly to the enabling described for the nonoverlapping case. In this manner, the output from NAND-gate 90 on conductor 98 provides a low output value signal having a width identical to that of pulse 52. This low output value pulse on conductor 98 provides a low input value connection to the input of NAND-gate 100 causing a high output value pulse to be generated at the output of the NAND-gate 100. This pulse is shown in the conductor 116 graph of FIG. 5.

As noted, prior to the termination of the pulse 54, the pulses 36 and 38 are initiated. Accordingly, when pulse 54 terminates and the input on conductor 74 at the NAND-gate 60 resumes its low input value, the output from NAND-gate 60 on the conductor 80 will again assume its high output value. Inasmuch as the pulse 38 has already commenced, it is appreciated that both inputs to the NAND-gate 62 will be at their high input value causing the output from this NAND gate on conductor 82 to assume its low output value. This output on conductor 82 is coupled with the input of the NAND-gate 60 thus ensuring that the output on the conductor 82 will remain at its low output value until the termination of the pulse 38. Of key importance to the overlap error avoidance feature is the fact that prior to the termination of the pulse 54, the output from the NAND-gate 64 on conductor 84 is at its high output value. Thus, when pulse 38 is commenced, the output from NAND-gate 66 on conductor 92 assumed its low output value disabling the NAND-gate 88 and blocking the pulse 36 preventing it from being passed to the NAND-gate 100. This low output value from the NAND-gate 66 is coupled by the conductor 102 with the input of the NAND-gate 64 to ensure that the output from the NAND-gate 64 on the conductor 84 maintains its high output value until the termination of pulse 38. In this manner, the output from NAND-gate 66 on conductor 92 will be at its low output value for a time coextensive with the pulse 38.

During the interval in which the output from NAND-gate 66 on conductor 92 is at its low output value, the output from NAND-gate 106 will be at its high output value and the output from the inverter NAND-gate 108 will be at its low output value (in FIG. 5 the graph of the output from NAND-gate 108 is labeled 108). At the termination of pulse 38, the output from NAND-gate 66 on conductor 92 resumes its high output value causing the output of the NAND-gate 106 to resume its low output value and the output from the inverter gate 108 (shown in FIG. 5 as graph 108) to resume its high output value, thus providing a signal to the monostable multivibrator 110. The monostable multivibrator 110 provides an output pulse in response to the leading edge of each input pulse supplied to it. The capacitor 118 connected with the monostable multivibrator 110 determines the duration of the pulse thus produced. In this manner, an auxiliary pulse is produced by the monostable multivibrator 110 which is connected by the conductor 112 with the NAND-gate 100. This pulse is added at the output of NAND-gate 100 instead of the pulse 36 which was blocked at the NAND-gate 88. Accordingly, the graph 116 of FIG. 5 is comprised of two pulses showing the sum of pulses 36 and 52. One of the pulses was formed in response to pulse 52 while the other was generated as an auxiliary pulse by the monostable multivibrator 110 to replace the blocked pulse 36.

Analogous operation obtains when pulses 36 and 38 precede pulses 52 and 54 in time. In that situation, however, NAND-gate 88 will be enabled and pulse 36 will pass, but NAND-gate 90 will be disabled and pulse 52 will be blocked. Accordingly, the count at the output will comprise pulse counts developed by pulse 36 and an auxiliary pulse from the monostable multivibrator 110 which will have been generated to replace the blocked pulse 52.

At the expense of some reiteration, the salient operating features of the FIG. 2 system will be reviewed. Two input signals $F_1$ and $F_2$ are applied to monostable multivibrators which generate the pulses 36, 38, 52 and 54 in response to the input signals. A logic array monitors pulses 38 and 54 to determine whether or not these pulses overlap in time. If the pulses 38 and 54 are nonoverlapping, NAND-gate 88 and 90 pass pulses 36 and 52 directly to the output NAND-gate 100 which in turn sums them to provide an output signal on conductor 116. In the event the pulses 38 and 54 are overlapping, the NAND gate logic array which monitors these pulses will disable one of the NAND-gate 88 or 90 to inhibit the latter appearing pulse 36 or 52 which is connected with that disabled NAND gate. In this manner, the logic monitoring array permits the pulse 36 or 52 which was first to appear to pass through its NAND-gate 88 or 90 directly to the output NAND-gate 100 where it is summed on conductor 116 in the output signal. If the pulses 36 and 52 appear simultaneously, the system selects one as having been "first" to appear and processes the signals in the manner described. Each blocked pulse is replaced by an auxiliary pulse generated by the monostable multivibrator 110 at the termination of both the pulses 38 and 54 which were overlapping. This auxiliary pulse is processed by the NAND-gate 100 and is included in the output signal on conductor 116. Thus, it is appreciated that the output signal from the NAND-gate 100 on conductor 116 comprises a train of pulses whose frequency is the sum of the frequencies of the input signals $F_1$ and $F_2$.

Figure 3:
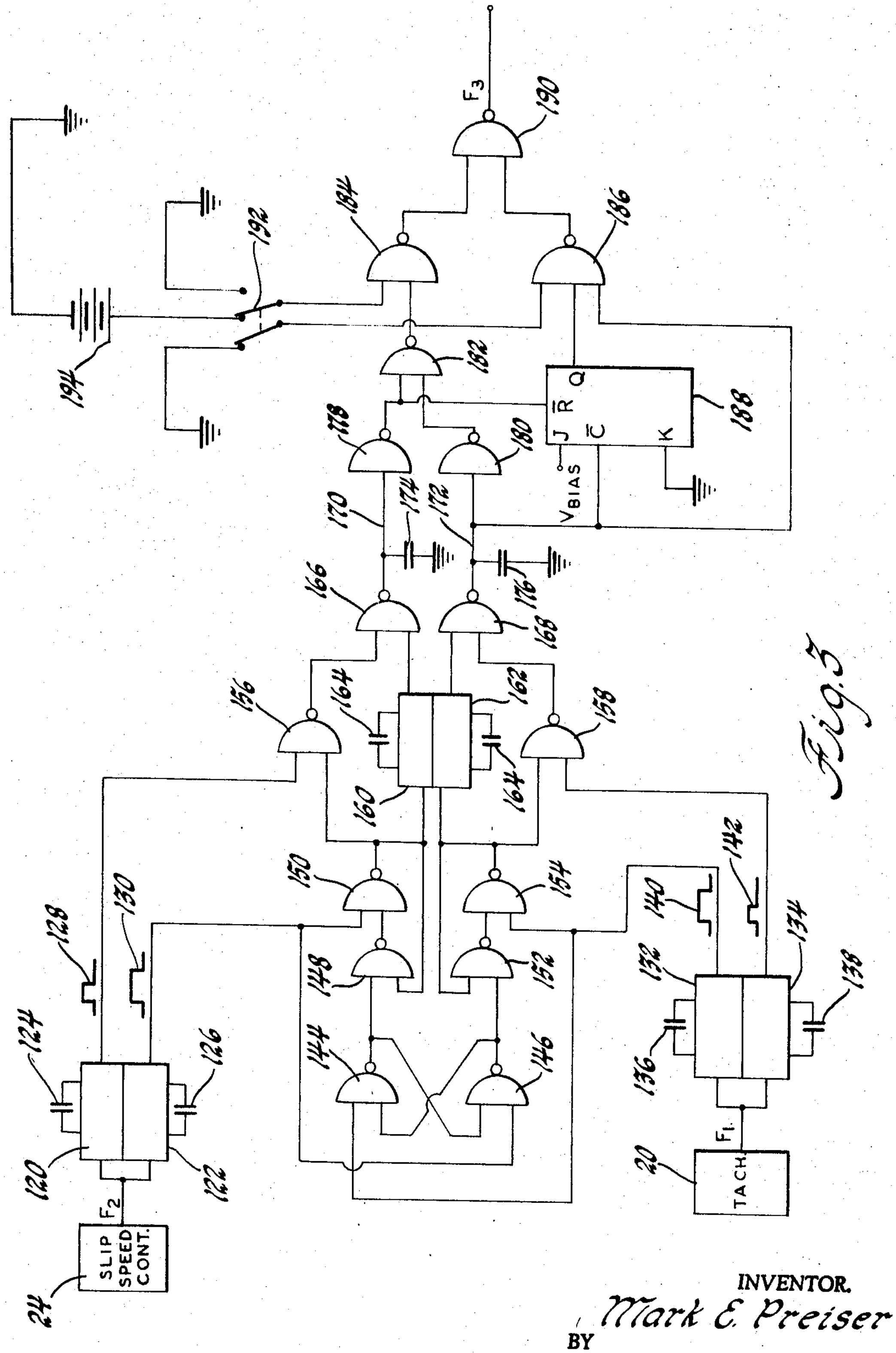
FIG. 3 is a schematic circuit of a digital system constructed in accordance with this invention capable of both addition and subtraction.

Referring now to FIG. 3, a digital frequency system similar to the system of FIG. 2 but modified so that it is capable of both addition and subtraction will be described. In this system, the two input signals $F_1$ and $F_2$ are either added or subtracted by the digital network according to the mode of operation selected.

The system of FIG. 3 generates pulses in response to the input signals $F_1$ and $F_2$ from the tachometer 20 and the slip speed control 24 and monitors them in the same manner as that set forth above for the system of FIG. 2. Monostable multivibrators 120 and 122 provided with timing capacitors 124 and 126 generate pulses 128 and 130 in response to the input signal $F_2$. Similarly, monostable multivibrators 132 and 134 are provided with timing capacitors 136 and 138 and generate pulses 140 and 142 in response to the input $F_1$. NAND-gate 144, 146, 148, 150, 152 and 154 comprise a monitoring array which ensures against pulse overlap errors. The function and operation of this monitoring array is the same as that described above for NAND-gate 60, 62, 64, 66, 68 and 70 of FIG. 2. The two NAND-gate 156 and 158 connected with the monitoring array determine if the pulses 128 and 142 will pass for further processing, that is, addition or subtraction depending on the mode of operation selected as described below. One of the NAND-gates 156 or 158 is disabled if the pulses 130 and 140 are overlapping. Accordingly, one of the pulses 128 or 142 is passed and one is blocked if the pulses 130 and 140 are overlapping. If the pulses 130 and 140 are nonoverlapping, both NAND-gates 156 and 158 are enabled at the requisite times to pass pulses 128 and 142 to the outputs of the NAND-gate 156 and 158.

When a possibility of error due to overlap exists, only one of the pulses 128 or 142 is passed by its NAND-gate 156 or 158 and, as noted above, the other is blocked by its NAND gate which is disabled by the monitoring array. Two monostable multivibrators 160 and 162 provided with identical timing capacitors 164 are used in the FIG. 3 system to generate auxiliary pulses to replace pulses blocked by the NAND-gates 156 and 158 when they are disabled. Monostable multivibrator 160 generates auxiliary pulses to replace pulses 128 which are blocked and monostable multivibrator 162 generates auxiliary pulses to replace pulses 142 which are blocked. The pulses 128 and 142 as well as the auxiliary pulses generated by the monostable multivibrators 160 and 162 are coupled through NAND-gates 166 and 168 to conductors 170 and 172. These conductors are provided with filter capacitors 174 and 176. Accordingly, two pulse trains are available on conductors 170 and 172 which do not have any pulses overlapping in time. The pulse train on conductor 170 is comprised of pulses 128 and auxiliary pulses generated to replace those pulses 128 which were blocked; this train has a frequency which is the same as that of the signal $F_2$. The pulse train on conductor 172 is comprised of pulses 142 and auxiliary pulses generated to replace those pulses 142 which were blocked; this train has a frequency which is the same as that of the signal $F_1$.

The processing of the signals available from the NAND-gates 166 and 168 on conductors 170 and 172 is performed by NAND-gates 178, 180, 182, 184, 186 and flip-flop 188. The flip-flop 188 is of conventional design typified by the flip-flop commercially available from Motorola having catalog No. MC 663. NAND-gate 190 provides an output signal $F_3$ having a frequency which is either the sum or the difference of the frequencies $F_1$ and $F_2$. The digital system is set for either addition or subtraction by the switch 192. This switch connects one input of each of the NAND-gates 184 and 186 selectively with ground or a positive bias voltage supplied by battery 194. The two movable contacts of the switch 192 are ganged for concurrent movement and accordingly, one of the NAND gate input leads connected with the switch is always supplied the bias voltage from the battery 194 while the other NAND gate input is connected with ground. To select addition, the switch is positioned as shown in FIG. 3 with the NAND-gate 184 input connected with the battery 194 and the NAND-gate 186 input connected with ground. In this situation, $F_3$ is equal to $F_1+F_2$. When the switch is moved to its other position such that the input of NAND-gate 186 is connected with the battery 194 and the input of NAND-gate 184 is connected with ground, the system performs subtraction. When the system performs subtraction, the frequency of the signal $F_2$ is subtracted from the frequency of the signal $F_1$ and the frequency of the output signal $F_3$ is accordingly equal to the frequency of the input signal $F_1$ less the frequency of the input signal $F_2$.

The operation of the processing facet of this digital frequency network involves two distinct procedures, one for addition and one for subtraction. During addition, the signals to be added are available from the NAND-gates 166 and 168 at the inputs to the NAND-gate 178 and 180. NAND-gates 178 and 180 invert the pulses from the NAND-gate 166 and 168. These pulses from NAND-gate 178 and 180 are then passed by the NAND-gate 182 to the input of the NAND-gate 184 and the NAND-gate 184 couples the pulses directly with the output NAND-gate 190 to provide the output signal $F_3$. In the addition process, the NAND-gate 186 and the flip-flop 188 are of no significance. The NAND-gate 186 merely provides a high output value for connection with the input of NAND-gate 190 since a constant low input value ground is connected with its input through the switch 192. This permits NAND-gate 190 to respond exclusively to the signal from NAND-gate 184 and, as noted above, the sum of the pulses on both conductors 170 and 172 is available at the output of NAND-gate 190.

To perform subtraction, the switch 192 is moved as noted above so one input of NAND-gate 186 is connected with the battery 194 and one input of NAND-gate 184 is connected with ground. In this situation, the NAND-gate 184 has an output which is constrained to its high output value by the connection of one of its inputs to ground through the switch 192. Accordingly, this NAND-gate 184 provides a continuous high input value to one input of the NAND-gate 190 and NAND-gate 190 responds exclusively to the output signal of NAND-gate 186. Pulses from NAND-gate 168 are coupled with the $\overline{C}$ input of flip-flop 188 and one input of the NAND-gate 186. Accordingly, if the output Q from flip-flop 188 is at its high output value, the pulses from NAND-gate 168 representative of the frequency of the input signal $F_1$ will pass directly to the NAND-gate 190 for inclusion in the output signal $F_3$. Flip-flop 188 provides an output signal at terminal Q which is dependent on both inputs $\overline{C}$ and $\overline{R}$. A bias voltage $V_{BIAS}$ is connected with input J of the flip-flop 188 and a ground connection is provided for the input K to complete the requisite connections with the flip-flop. Assuming the output Q is at its high output value, a pulse supplied to the $\overline{R}$ input will cause the output Q to switch to its low output value. Output Q then maintains its low output value until a pulse is supplied to the input $\overline{C}$ causing output Q again to resume its high output value. It is noted that Q resets on the trailing edge of the pulse supplied to the input $\overline{C}$. When the output Q provides its high output value, additional pulses applied to the input $\overline{C}$ have no affect on the flip-flop 188. In view of the fact that the signal $F_1$ must have a higher frequency than signal $F_2$, it should be appreciated that at least one pulse from the NAND-gate 168 will occur intermediate each pair of pulses from the NAND-gate 166 which are connected with the input $\overline{R}$.

Accordingly, when the system is subtracting, each pulse generated in response to the input signal $F_2$ will cancel one pulse generated in response to the input signal $F_1$ through the action described for the flip-flop 188. The remaining pulses generated in response to the input signal $F_1$ will be coupled through the NAND-gates 186 and 190 for inclusion in the output signal $F_3$. Thus, it is seen that the output signal $F_3$ will be comprised of a train of pulses which has a frequency equal to the frequency of the input signal $F_1$ less the frequency of the input signal $F_2$.

It should be appreciated that the digital frequency system of FIG. 3 is ideally suited for inclusion in the motor control network of FIG. 1 when it is desirable to include both braking and motoring in the motor control system. Inasmuch as the output signal $F_3$ is either the sum or the difference of the input signals $F_2$ and $F_1$ according to the position of the switch 192, braking and motoring operating modes are readily selected. In the FIG. 1 motor system, as noted above, the input signal $F_1$ is the tachometer indication from the tachometer 20 and the input signal $F_2$ is the control signal indication from the slip speed control 24 and the output signal $F_3$, which can be $F_1+F_2$ or $F_1-F_2$, is shown as $F_1+F_2$ which is connected with the triggers 18.

Although this invention has been described with particular reference to two specific embodiments, it should be appreciated that this description is merely exemplary without any intention of limitation.

I claim:

1. A method of digital frequency addition, comprising: generating a first pulse train having a pulse frequency $F_1$ and a predetermined minimum time spacing representative of the frequency of a first electrical signal, generating a second pulse train having a pulse frequency $F_2$ and a predetermined minimum time spacing representative of the frequency of a second electrical signal, monitoring said first and second pulse trains to determine if they include overlapping pulses, adding all nonoverlapping pulses of said first and second pulse trains by passing them to an output terminal, inhibiting a pulse in one of said pulse trains for each pair of overlapping pulses and passing the other pulse of the overlapping pair of pulses to said output terminal, generating an auxiliary pulse and passing said auxiliary pulse to said output terminal after the termination of the inhibited pulse at a time less than the least of the predetermined time spacings of said pulse trains to replace the inhibited pulse when a pair of pulses are overlapping whereby, a pulse signal is developed at said output terminal having a frequency $F_1+F_2$ which is the sum of the frequencies of said first and second electrical signals.

2. A method of digital frequency addition, comprising: generating a first pulse of unit width for each cycle of a first electrical signal having frequency $F_1$, generating a second pulse having a width greater than unit width for each cycle of said first electrical signal, generating a third pulse of unit width for each cycle of a second electrical signal having frequency $F_2$, generating a fourth pulse having a width greater than unit width for each cycle of said second electrical signal, monitoring said second and fourth pulses to determine if they are overlapping, passing said first and third pulses to an output for addition if said second and fourth pulses are nonoverlapping, inhibiting either said first or third pulse and passing the other of said first and third pulses to said output for addition if said second and fourth pulses are overlapping, generating an auxiliary pulse after the termination of the inhibited pulse to replace the inhibited pulse when said second and fourth pulses are overlapping, passing all auxiliary pulses to said output for addition whereby, an accurate count for the sum of frequencies of the two input electrical signals $F_1+F_2$ is provided.

3. A method of digital frequency addition and subtraction, comprising: generating a first pulse train comprised of one pulse of unit width for each cycle of a first electrical signal having frequency $F_1$, generating a second pulse train comprised of one pulse having a width greater than unit width for each cycle of said first electrical signal, generating a third pulse train comprised of one pulse of unit width for each cycle of a second electrical signal having frequency $F_2$ which frequency is equal to or less than frequency $F_1$, generating a fourth pulse train comprised of one pulse having a width greater than unit width for each cycle of said second electrical signal, monitoring said second and fourth pulse trains to determine if the respective pulses are overlapping, passing the pulses of both said first and third pulse trains for processing if the associated pulses of said second and fourth pulse trains are nonoverlapping, eliminating a pulse from either said first pulse train or said third pulse train for each pair of overlapping pulses in said second and fourth pulse trains, generating an auxiliary pulse for inclusion in said first or third pulse train to replace each eliminated pulse, selecting a mode of operation to effect either addition or subtraction, summing the pulses of said first and third pulse trains if addition is the selected mode, cancelling a pulse from said first pulse train for each pulse of said second pulse train if subtraction is the selected mode, and providing an output which is the sum $(F_1+F_2)$ or difference $(F_1-F_2)$ of the frequencies of said first and second electrical signals according to the mode of operation selected.

4. A digital frequency addition apparatus, comprising: first and second input means adapted to be connected with first and second input voltage signals having frequencies $F_1$ and $F_2$, said first input means providing a first pulse output of unit width and a second pulse output of width greater than unit width in response to each cycle of input voltage connected with it, said second input means providing a first pulse output of unit width and a second pulse output of width greater than unit width in response to each cycle of input voltage connected with it, a NAND logic array monitoring means, means connecting said second pulse outputs with said monitoring means, first and second two-input NAND gates, means connecting said monitoring means with one input of each of said first and second two-input NAND gates, means connecting said first pulse outputs respectively with the remaining input of each of said first and second two-input NAND gates, a monostable multivibrator, means connecting said monitoring means with said monostable multivibrator, a three-input NAND gate, the output of said three-input NAND gate providing an output for said frequency addition apparatus, means connecting the outputs of said first and second two-input NAND gates with two respective inputs of said three-input NAND gate, means connecting said monostable multivibrator with the third input of said three-input NAND gate, said monitoring means enabling said first and second two-input NAND gates to pass said first pulse outputs from said first and second input means to said three-input NAND gate if said second pulse outputs are nonoverlapping, said three-input NAND gate passing said first pulse outputs directly to the output for addition if said second pulse outputs are nonoverlapping, said monitoring means disabling one of said first and second two-input NAND gates if said second pulse outputs are overlapping, said monitoring means thus permitting one of said first pulse outputs to pass to said three-input NAND gate and blocking the other of said first pulse outputs at the disabled two-input NAND gate preventing it from passing to said three-input NAND gate, said three-input NAND gate passing the first pulse output from the enabled two-input NAND gate to its output for addition, said monitoring means actuating said monostable multivibrator to generate an auxiliary pulse to replace the first output pulse blocked by the disabled two-input NAND gate, said auxiliary pulse being connected with said three-input NAND gate and passing to its output for addition whereby, said output from said three-input NAND gate affords a pulse signal indicative of the sum $(F_1+F_2)$ of the frequencies of the input signals which is comprised of said first pulse outputs and said auxiliary pulses.

* * * * *